(12) United States Patent
Ting et al.

(10) Patent No.: US 9,946,506 B2
(45) Date of Patent: Apr. 17, 2018

(54) DUAL SCREEN POINT-OF-SALE SYSTEM

(71) Applicant: FLYTECH TECHNOLOGY CO., LTD, Taipei (TW)

(72) Inventors: Yao-Cheng Ting, Taipei (TW); Pin-Chieh Liu, Taipei (TW)

(73) Assignee: FLYTECH TECHNOLOGY CO., LTD, Taipei (TW)

( * ) Notice: Subject to any disclaimer, the term of this patent is extended or adjusted under 35 U.S.C. 154(b) by 182 days.

(21) Appl. No.: 15/048,032

(22) Filed: Feb. 19, 2016

(65) Prior Publication Data

US 2017/0185363 A1 Jun. 29, 2017

(30) Foreign Application Priority Data

Dec. 29, 2015 (TW) .............................. 104221044 U

(51) Int. Cl.
 *G07G 1/06* (2006.01)
 *G06F 1/16* (2006.01)
 (Continued)

(52) U.S. Cl.
 CPC .......... *G06F 3/1431* (2013.01); *G06F 1/1626* (2013.01); *G06F 1/1654* (2013.01); *G06F 3/005* (2013.01); *G06F 3/1454* (2013.01); *G06Q 20/20* (2013.01); *G07G 1/01* (2013.01); *G07G 1/06* (2013.01); *G07G 1/12* (2013.01); *G06F 1/1643* (2013.01); *G06F 1/1649* (2013.01); *G06Q 20/204* (2013.01)

(58) Field of Classification Search
 CPC .... G06F 3/1431; G06F 3/1438; G06F 3/1454; G06F 3/1423; G06F 3/1626; G06F 3/1632; G06F 3/1633; G06F 3/1637; G06F 3/1643; G06F 3/1647; G06F 3/1654; G06F 3/005; G06F 3/002; G06F 3/02; G06F 1/1626; G06F 1/1632; G06F 1/1633; G06F 1/1637; G06F 1/1643; G06F 1/1647; G06F 1/1654; G06F 1/1649; G06Q 20/20; G06Q 20/204; G06Q 20/32; G07G 1/00; G07G 1/01; G07G 1/06; G07G 1/14; G07G 1/12
 See application file for complete search history.

(56) References Cited

FOREIGN PATENT DOCUMENTS

GB 2505867 A * 3/2014

OTHER PUBLICATIONS

EPO search opinion, 16000584.9, dated Feb. 7, 2017.*

* cited by examiner

*Primary Examiner* — Julie Anne Watko
(74) *Attorney, Agent, or Firm* — WPAT, PC

(57) ABSTRACT

A dual screen point-of-sale system includes a point-of-sale device and a tablet computer. The point-of-sale device includes a first display screen and a first connection part. A first picture of the point-of-sale device is shown on the first display screen in response to a first device signal. The first connection part receives the first device signal. The tablet computer includes a second connection part and a second display screen. When the first connection part and the first connection part are in communication with each other, the first device signal is transmitted from the point-of-sale device to the tablet computer. Consequently, a picture corresponding to the first device signal is shown on the second display screen. When the first connection part and the first connection part are not in communication with each other, a second picture is shown on the second display screen.

13 Claims, 6 Drawing Sheets

(51) Int. Cl.
    *G06F 3/00*           (2006.01)
    *G07G 1/12*           (2006.01)
    *G06Q 20/20*         (2012.01)
    *G06F 3/14*           (2006.01)
    *G07G 1/01*           (2006.01)
    *G06F 5/16*           (2006.01)
    *G06F 3/041*         (2006.01)

DUAL SCREEN POINT-OF-SALE SYSTEM

FIELD OF THE INVENTION

The present invention relates to a point-of-sale device, and more particularly to a detachable point-of-sale device.

BACKGROUND OF THE INVENTION

A point-of-sale device, also referred as a POS device, is a widely used electronic device in retail industry nowadays, and is mainly used for managing products and the customer information. Generally, the POS device is usually disposed on a cashier desk in a convenience store, a shop or a supermarket for displaying the information and the sum of price of merchandise purchased by consumers. Consequently, it is convenient for a cashier to operate the counting task and avoid errors that may be generated in the checkout process.

Please refer to FIGS. 1 and 2. FIG. 1 is a schematic perspective view illustrating a conventional POS device. FIG. 2 is a schematic perspective view illustrating the conventional POS device of FIG. 1 and taken along another viewpoint. The POS device 1 comprises an operating main body 11, a backside cover 12, a support base 13 and a computer host (not shown). The operating main body 11 is disposed on the support base 13. Consequently, the POS device 1 can be placed on any placement surface (e.g., a desk surface). Moreover, the operating main body 11 has a touch screen 111. When the touch screen 111 is operated by the user, a touch control function is provided. The backside cover 12 is used for partially covering the operating main body 11. Moreover, an accommodation space (not shown) is arranged between the operating main body 11 and the backside cover 12. The computer host is disposed within the accommodation space between the operating main body 11 and the backside cover 12. The computer host comprises a motherboard, a hard disk drive, a memory and/or other electronic components. The computer host is used for executing various calculations and saving the merchandise information (e.g., the amount of merchandise, the price of merchandise, the stock of merchandise, the gross profit or the like). In addition, the cashier can watch the merchandise information which is displayed on the operating main body 11.

The POS device 1 can be used in a restaurant for ordering. Moreover, the POS device 1 is in communication with an ordering system of the restaurant. An ordering program is installed in the POS device 1. When the ordering program is executed, a picture containing an ordering interface is shown on the operating main body 11. The ordering interface contains plural ordering items corresponding to various meals. However, some restaurants offer table carte service that allows customers to directly order meals to the waiters beside the table. For complying with the table carte service, a detachable POS device has been introduced into the market. Generally, after the operating main body is detached, the waiter may hold the operating main body with a hand and take the order beside the table. After the ordering service is completed by using the operating main body, the ordering information is transmitted to the ordering system. Consequently, the waiter does not need to use the traditional way to record meals and input the meal items to the ordering system through the POS device.

On the basis of the above technologies, a dual screen POS system has been introduced into the market. The dual screen POS system has two display screens for increasing the functions of the POS device. However, the dual screen POS system needs to be further improved. Therefore, there is a need of providing an improved dual screen POS system in order to overcome the above drawbacks.

SUMMARY OF THE INVENTION

For solving the drawbacks of the conventional technologies, the present invention provides a dual screen POS system with multiple functions.

In accordance with an aspect of the present invention, there is provided a dual screen point-of-sale system. The dual screen point-of-sale system includes a point-of-sale device and a tablet computer. The point-of-sale device includes a first display screen and a first connection part. A first picture of the point-of-sale device is shown on the first display screen in response to a first device signal. The first connection part receives the first device signal. The tablet computer is detachably assembled with the point-of-sale device, and includes a second connection part and a second display screen. When the first connection part and the second connection part are in communication with each other, the first device signal is received by the second connection part. A second picture of the tablet computer is shown on the second display screen, or a picture corresponding to the first device signal is shown on the second display screen. When the first connection part and the second connection part are in communication with each other, a converted first device signal is transmitted from the point-of-sale device to the tablet computer through the first connection part and the second connection part, so that the picture corresponding to the first device signal is shown on the second display screen. When the first connection part and the second connection part are not in communication with each other, the second picture is shown on the second display screen.

In an embodiment, the first device signal contains a first picture signal corresponding to the first picture and an extended picture signal corresponding to an extended picture. When the first picture signal is received by the tablet computer, the first picture is shown on the second display screen in response to the first picture signal. When the extended picture signal is received by the tablet computer, the extended picture is shown on the second display screen in response to the extended picture signal.

In an embodiment, the point-of-sale device includes a connection interface and a first converter. The first picture signal corresponding to the first picture or the extended picture signal corresponding to the extended picture is transferred through the connection interface. The first converter is electrically connected with the connection interface and the first connection part. When the first picture signal or the extended picture signal is received by the first converter, the first picture signal or the extended picture signal is converted into a serialized signal by the first converter. The serialized signal is the converted first device signal, and the serialized signal is transmitted to the first connection part.

In an embodiment, the first converter is a serializer.

In an embodiment, a number of electrically-connected pins of the connection interface is larger than a number of electrically-connected pins of the first connection part.

In an embodiment, the tablet computer further includes a second converter, a controlling unit and a switch element. The second converter is electrically connected with the second connection part. When the serialized signal is received by the second converter through the first connection part and the second connection part, the serialized signal is converted into the first picture signal or the extended picture signal by the second converter. The controlling unit issues a second picture signal corresponding to the second picture. The switch element is electrically connected with the second converter, the controlling unit and the second display screen. The first device signal or the second picture signal is selectively transmitted to the second display screen through the switch element, so that the picture corresponding to the first device signal or the second picture is shown on the second display screen. When the first picture signal of the first device signal is received by the switch element and the first picture signal is transmitted to the second display screen through the switch element, the first picture is shown on the second display screen. When the extended picture signal of the first device signal is received by the switch element and the extended picture signal is transmitted to the second display screen through the switch element, the extended picture is shown on the second display screen. When the second picture signal is received by the switch element and the second picture signal is transmitted to the second display screen through the switch element, the second picture signal is shown on the second display screen.

In an embodiment, the first picture, the second picture or the extended picture is shown on the second display screen in a full screen mode.

In an embodiment, the tablet computer further includes a second converter, a camera module, a switch element and a controlling module. The second converter is electrically connected with the second connection part. When the serialized signal is received by the second converter through the first connection part and the second connection part, the serialized signal is converted into the first device signal by the second converter. The camera module provides a camera signal corresponding to a camera-captured picture. The switch element is electrically connected with the second converter and the camera module. The switch element receives the first device signal and the camera signal and selectively outputs the first device signal or the camera signal. The controlling module is electrically connected with the second converter, the second display screen and the switch element. A second picture signal corresponding to the second picture is outputted from the controlling module to the second display screen, or the camera-captured picture is shown on the second display screen under control of the controlling module. If the controlling module judges that the first connection part and the second connection are not in communication with each other, the second picture is shown on the second display screen under control of the controlling module. If the controlling module judges that the first connection part and the second connection are in communication with each other, the picture corresponding to the first device signal is shown on the second display screen under control of the controlling module.

In an embodiment, the controlling module includes a detecting element and a controlling unit. The detecting element is electrically connected with the second converter for judging whether the first connection part and the second connection are in communication with each other. If the detecting element judges that the first connection part and the second connection are in communication with each other, the detecting element issues an enabling signal. If the detecting element judges that the first connection part and the second connection are not in communication with each other, the detecting element issues a disabling signal. The controlling unit is electrically connected with the switch element, the second display screen and the detecting element. The second picture signal is outputted from the controlling unit to the second display screen, or the camera-captured picture is shown on the second display screen under control of the controlling unit when the camera signal is received by the controlling unit.

In an embodiment, if the first device signal is received by the controlling unit after the camera-captured picture is shown on the second display screen, the camera-captured picture is replaced by the picture corresponding to the first device signal.

In an embodiment, if the detecting element judges that the first connection part and the second connection are not in communication with each other, the detecting element issues a disabling signal to the controlling unit. In response to the disabling signal, the picture corresponding to the first device signal is not shown on the second display screen under control of the controlling unit.

In an embodiment, the picture corresponding to the first device signal and the second picture are shown on the second display screen in a picture-in-picture mode. The second picture is a main picture shown on the second display screen, and the picture corresponding to the first device signal is a sub picture shown on the second display screen.

In an embodiment, the second converter is a deserializer.

From the above descriptions, the present invention provides the dual screen POS system. The picture shown on the tablet computer of the dual screen POS system is determined according to the operating state of the tablet computer. In case that the tablet computer is assembled with the POS device, the first picture is shown on both of the second display screen of the tablet computer and the first display screen of the POS device. Alternatively, in some embodiments, the first picture is shown on the first display screen, and the extended picture is shown on the second display screen. According to the practical requirements, the first picture (or the extended picture) is shown on the second display screen in the full screen mode, or the first picture (or the extended picture) and the second picture are shown on the second display screen in a picture-in-picture mode. Consequently, the functions of the dual screen POS system are enhanced; the dual screen POS system is suitably applied to various use scenarios.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
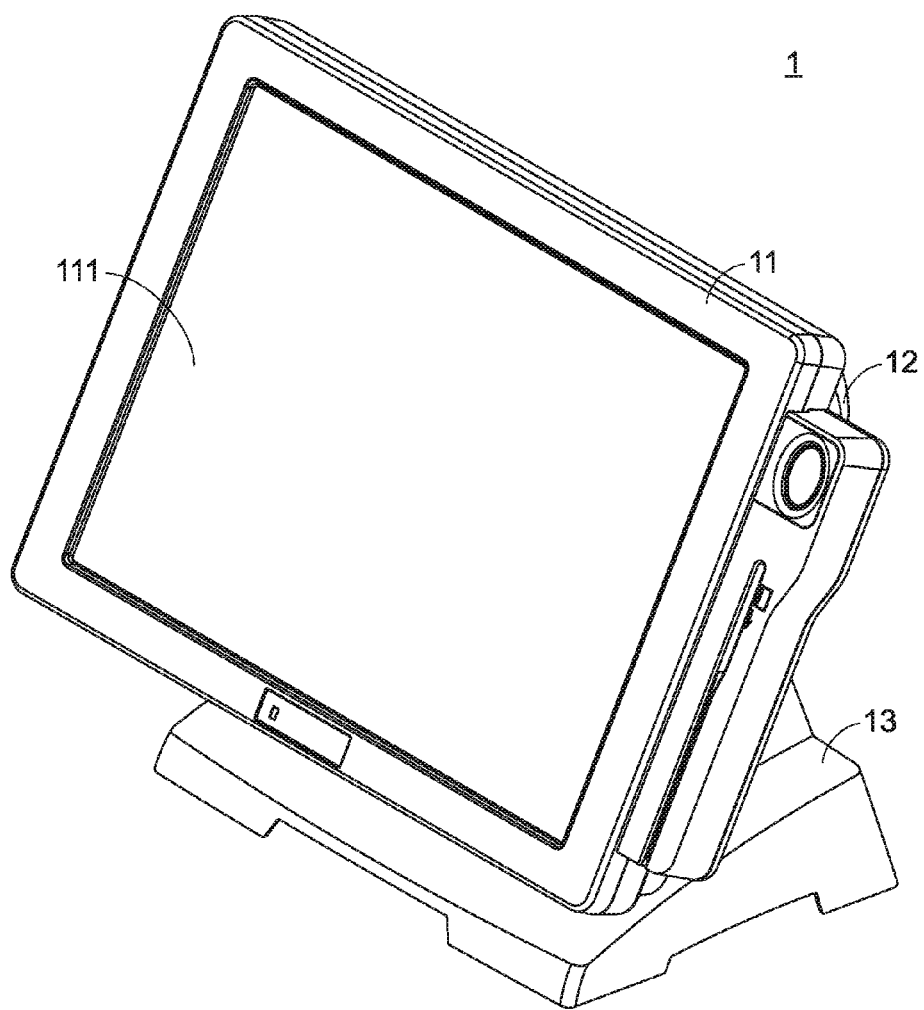
FIG. 1 is a schematic perspective view illustrating a conventional POS device.
Figure 2:
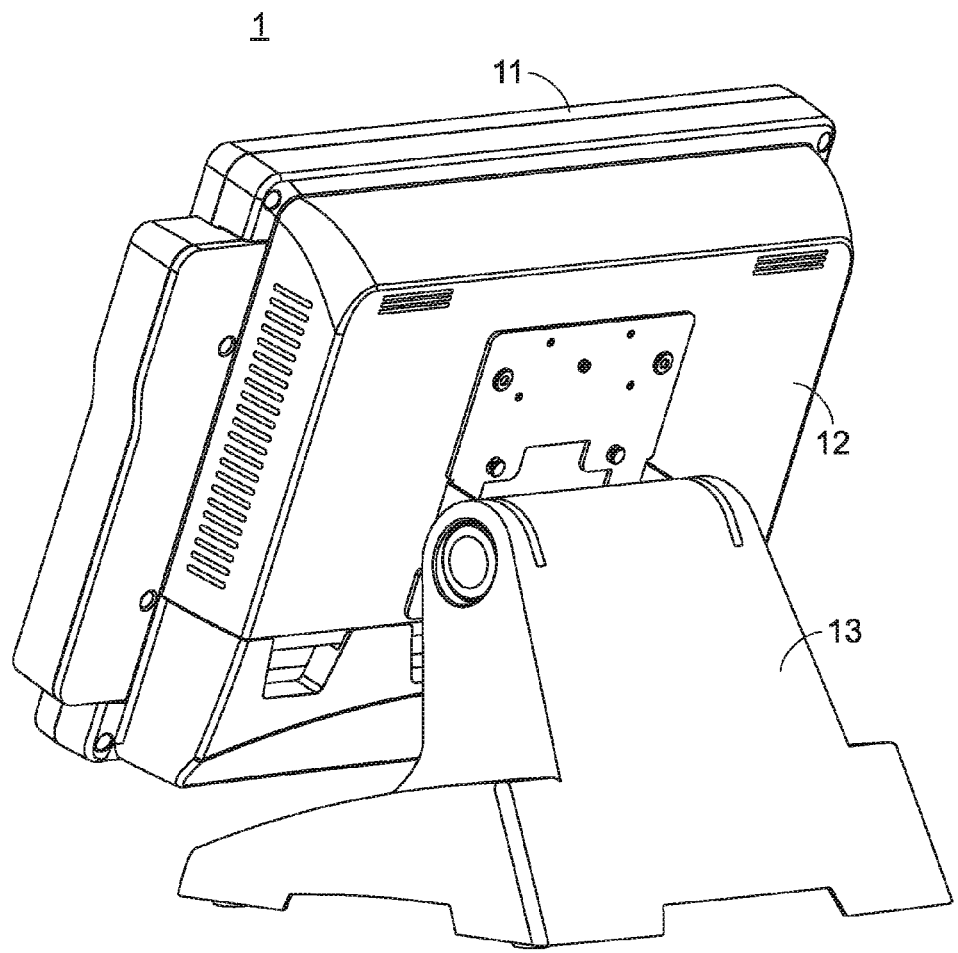
FIG. 2 is a schematic perspective view illustrating the conventional POS device of FIG. 1 and taken along another viewpoint.
Figure 3:
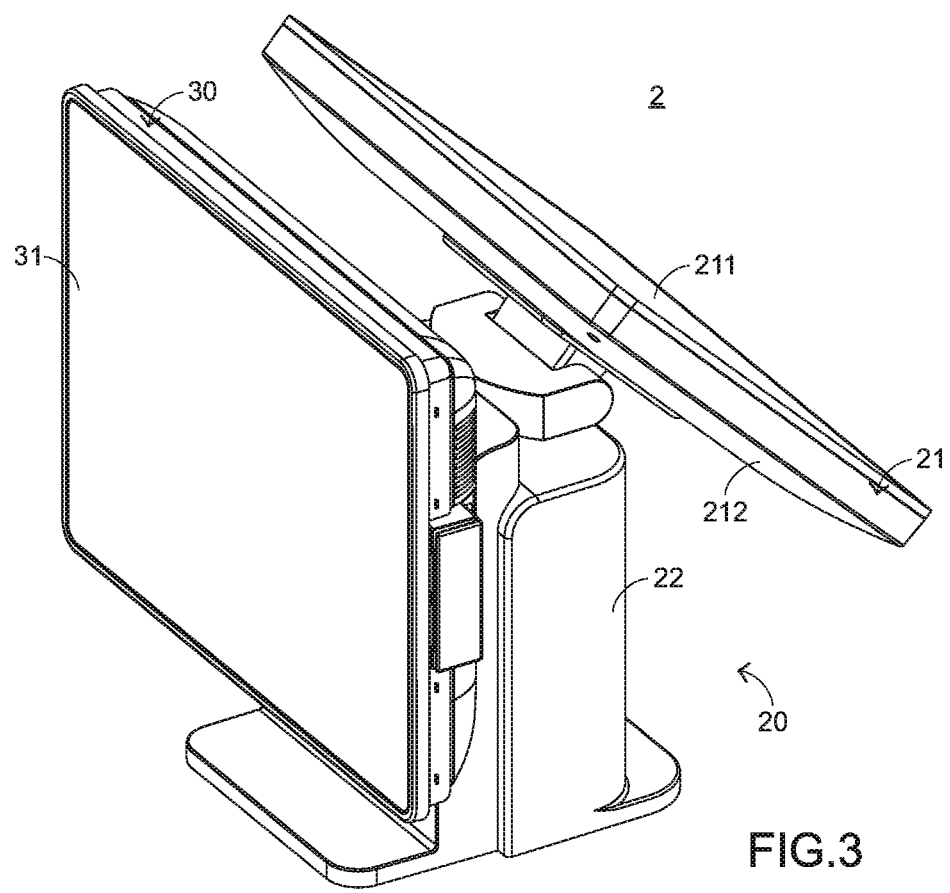
FIG. 3 is a schematic perspective view illustrating a dual screen POS system according to a first embodiment of the present invention.

The present invention provides a dual screen POS system that is detachable. Hereinafter, the outer appearance of the dual screen POS system will be illustrated with reference to FIG. 3. FIG. 3 is a schematic perspective view illustrating a dual screen POS system according to a first embodiment of the present invention. As shown in FIG. 3, the dual screen POS system 2 comprises a POS device 20 and a tablet computer 30. The POS device 20 comprises an operating main body 21 and a support base 22. The support base 22 is used for supporting the operating main body 21 and the tablet computer 30. In this embodiment, the operating main body 21 comprises a first display screen 211 and a backside cover 212. The first display screen 211 is used for displaying a first picture of the POS device 20. The display screen 211 is partially covered by the backside cover 212. The tablet computer 30 is detachably disposed on the support base 22 of the POS device 20. The tablet computer 30 comprises a second display screen 31. The second display screen 31 is used for displaying a second picture of the tablet computer 30, or displaying the first picture of the POS device 20 or an extended picture corresponding to the first picture. Preferably but not exclusively, the first display screen 211 and the second display screen 31 are touch screens.

Moreover, in the dual screen POS system 2, the picture shown on the second display screen 31 of the tablet computer 30 is determined according to the relationship between the tablet computer 30 and the POS device 20. For example, in case that the tablet computer 30 is not assembled with the POS device 20 (i.e., the tablet computer 30 is detached from the POS device 20), the second picture of the tablet computer 30 is shown on the second display screen 31. Whereas, in case that the tablet computer 30 is assembled with the POS device 20, the first picture of the POS device 20 or the extended picture is shown on the second display screen 31.

Figure 4:
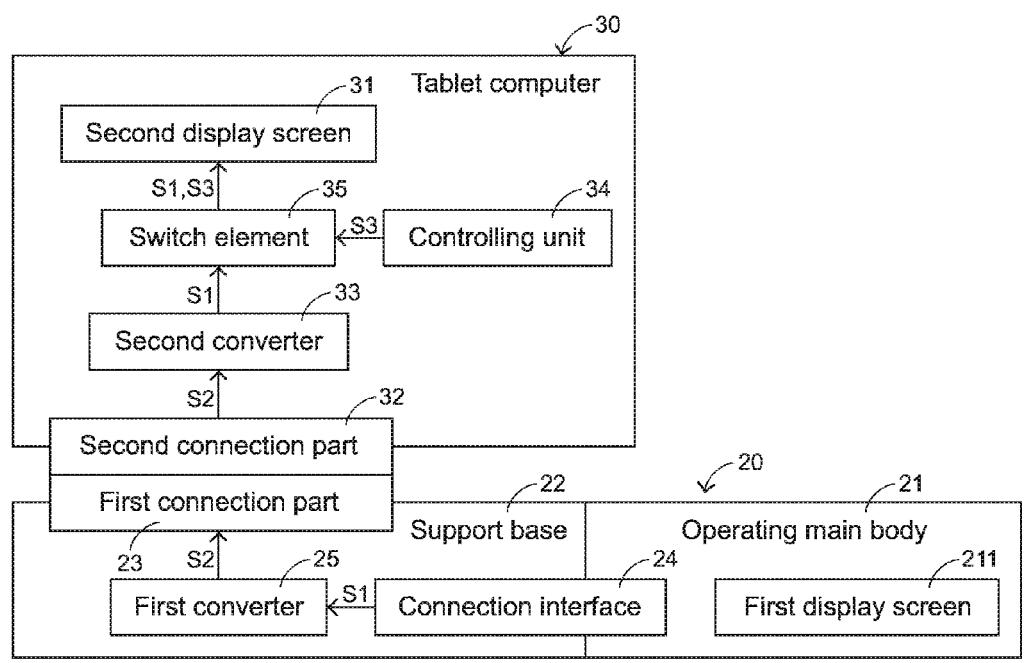
FIG. 4 is a schematic functional block diagram illustrating the dual screen POS system according to the first embodiment of the present invention.

Hereinafter, the internal structure of the dual screen POS system 2 will be illustrated with reference to FIGS. 3 and 4. FIG. 4 is a schematic functional block diagram illustrating the dual screen POS system according to the first embodiment of the present invention. As mentioned above, the POS device 20 comprises the operating main body 21 and the support base 22. In addition, the POS device 20 further comprises a first connection part 23, a connection interface 24 and a first converter 25. The first connection part 23, the connection interface 24 and the first converter 25 are installed in the support base 22. The first connection part 23 is exposed outside the support base 22. Through the first connection part 23, the electric connection between the POS device 20 and the tablet computer 30 is established. The connection interface 24 is in communication with an image source (not shown) within the operating main body 21. A first device signal S1 is transferred through the connection interface 24. In this embodiment, the first device signal S1 contains a first picture signal corresponding to the first picture and an extended picture signal corresponding to the extended picture. The first converter 25 is electrically connected with the connection interface 24. After the first device signal S1 is received by the first converter 25, the first device signal S1 is converted into a serialized signal S2 by the first converter 25 according to a SERDES technology. In addition, the serialized signal S2 is transmitted to the first connection part 23.

In an embodiment, the extended picture is a picture that is connected with the first picture and extended from the first picture. In another embodiment, the extended picture is different from the first picture. For example, in case that the dual screen POS system is provided for a cashier to operate the counting task, the first picture shown on the first display screen can be watched by the cashier for facilitating the cashier to operate the counting task, and the contents of the extended picture shown on the second display screen may contain the merchandise item, the price and other information to be watched by the customers.

In the POS device 20, the number of the electrically-connected pins of the connection interface 24 is larger than the number of the electrically-connected pins of the first connection part 23. Moreover, the serialized signal S2 is in a FPD-LINK (Flat Panel Display Link) format. Preferably but not exclusively, the connection interface 24 is one of a HDMI interface, a DP interface and a DVI interface, and the first converter 25 is a serializer.

As mentioned above, the tablet computer 30 comprises the second display screen 31. Moreover, the tablet computer 30 further comprises a second connection part 32, a second converter 33, a controlling unit 34 and a switch element 35. The second connection part 32 is exposed outside of the tablet computer 30. Moreover, after the second connection part 32 is in communication with the first connection part 23, the electric connection between the POS device 20 and the tablet computer 30 is established. The second converter 33 is electrically connected with the second connection part 32. After the serialized signal S2 is received by the second converter 33 through the first connection part 23 and the second connection part 32, the serialized signal S2 is converted into the first device signal S1 by the second converter 33. The controlling unit 34 issues the second picture signal S3 corresponding to the second picture. When the second picture signal S3 is received by the second display screen 31, the second picture is shown on the second display screen 31. In an embodiment, the second converter 33 is a deserializer, and the controlling unit 34 is a microprocessor or a control chip.

The switch element 35 is electrically connected with the second converter 33, the controlling unit 34 and the second display screen 31. The switch element 35 is used for selectively transferring the first device signal S1 or the second picture signal S3 to the second display screen 31. Consequently, either the first picture or the second picture is shown on the second display screen 31 in a full screen mode. When the first device signal S1 is received by the switch element 35, the first device signal S1 is transmitted to the second display screen 31 and the first picture is shown on the second display screen 31. Whereas, when the second picture signal S3 is received by the switch element 35, the second picture signal S3 is transmitted to the second display screen 31 and the second picture signal S3 is shown on the second display screen 31.

In case that the POS device 20 is not assembled with the tablet computer 30, the first connection part 23 and the second connection part 32 are not electrically connected with each other. Under this circumstance, only the second picture signal S3 from the controlling unit 34 is received by the switch element 35, and thus the second picture of the tablet computer 30 is shown on the second display screen 31.

In case that the tablet computer 30 is assembled with the POS device 20 and the dual screen POS system 2 is constructed, the first device signal S1 corresponding to the first picture or the extended picture is transmitted from the POS device 20 to the switch element 35 through the first connection part 23 and the second connection part 32 and through the SERDES process. Consequently, the picture shown on the second display screen 31 is changed from the second picture of the tablet computer 30 to the first picture of the POS device 20. In this embodiment, the second picture or the first picture (or the extended picture) is shown on the second display screen 31 in a full screen mode.

During the process of transmitting the first device signal S1, the first picture signal and the extended picture signal are not simultaneously transmitted. That is, either the first picture signal or the extended picture signal is transmitted at each time. Consequently, either the first picture signal or the extended picture signal is shown on the second display screen 31 of the dual screen POS system 2 according to the practical requirements.

From the above descriptions, the picture shown on the tablet computer 30 of the dual screen POS system 2 is determined according to the operating state of the tablet computer 30. In case that the tablet computer 30 is assembled with the POS device 20, the first picture is shown on both of the second display screen 31 of the tablet computer 30 and the first display screen 211 of the POS device 20. Under this circumstance, the same picture can be watched by plural users through different display screens in order to facilitate the processing of the meeting or discussion. Alternatively, in some embodiments, the first picture is shown on the first display screen 211, and the extended picture different from the first picture is shown on the second display screen 31. Consequently, the first picture and the extended picture are watched by different users. On the other hand, in case that the tablet computer 30 is detached from the POS device 20, the second picture of the tablet computer 30 is shown on the second display screen 31.

While the first picture (or the extended picture) is shown on the tablet computer 30, the following approaches are adopted. For example, the second display screen 31 and the switch element 35 are continuously enabled, but the other components are disabled. Alternatively, some priority events are set in the controlling unit. Once a priority event occurs, the corresponding priority event window is jumped and shown on the second display screen, and the first picture (or the extended picture) is no longer shown on the tablet computer 30.

Figure 5:
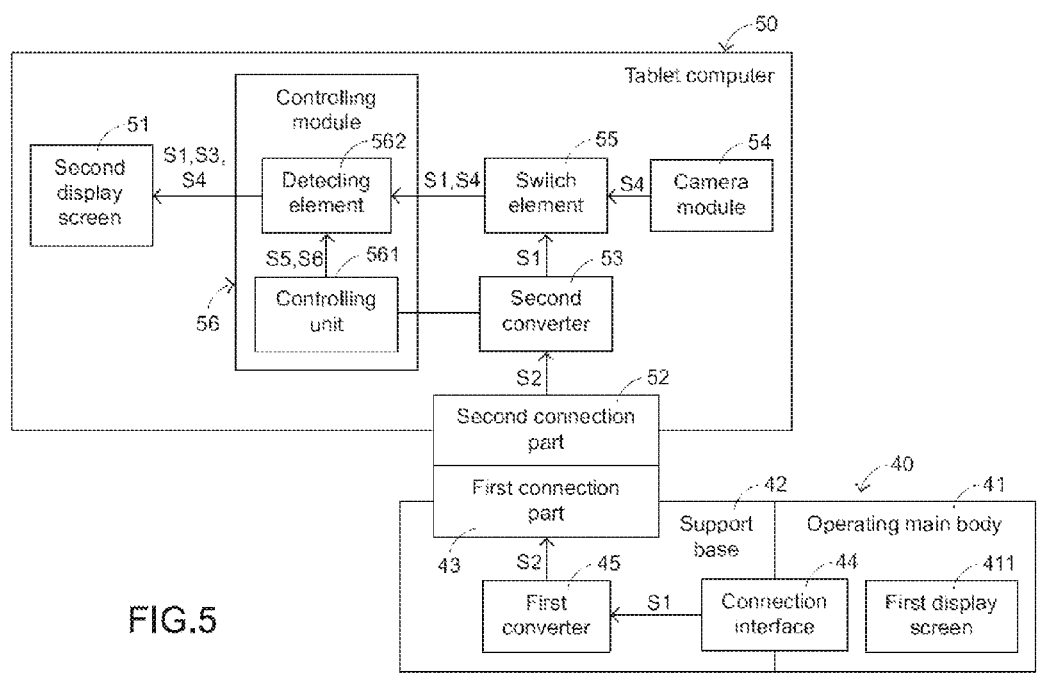
FIG. 5 is a schematic functional block diagram illustrating the dual screen POS system according to a second embodiment of the present invention.

The present invention further provides a dual screen POS system of a second embodiment, which is distinguished from the first embodiment. FIG. 5 is a schematic functional block diagram illustrating the dual screen POS system according to a second embodiment of the present invention. As shown in FIG. 5, the dual screen POS system 4 comprises a POS device 40 and a tablet computer 50. The POS device 40 comprises an operating main body 41, a support base 42, a first connection part 43, a connection interface 44 and a first converter 45. The operating main body 41 comprises a first display screen 411 and a backside cover (not shown). In this embodiment, the tablet computer 50 comprises a second display screen 51, a second connection part 52, a second converter 53, a camera module 54, a switch element 55 and a controlling module 56. The components of the dual screen POS system 4 which are similar to those of the dual screen POS system 2 of the first embodiment will not be redundantly described herein. In comparison with the first embodiment, the internal structures of the tablet computer 50 in the dual screen POS system 4 of this embodiment are distinguished.

The second connection part 52 is exposed outside of the tablet computer 50. Moreover, after the second connection part 52 is in communication with the first connection part 43, the electric connection between the POS device 40 and the tablet computer 50 is established. The second converter 53 is electrically connected with the second connection part 52. After the serialized signal S2 is received by the second converter 53 through the first connection part 43 and the second connection part 52, the serialized signal S2 is converted into the first device signal S1 by the second converter 53. The cameral module 54 is electrically connected with the switch element 55. Moreover, a camera signal S4 corresponding to a camera-captured picture is provided from the cameral module 54 to the switch element 55. The switch element 55 is electrically connected with the second converter 53 and the cameral module 54. The switch element 55 receives the camera signal S4 and the first device signal S1 from the POS device 40, and selectively outputs the first device signal S1 or the camera signal S4 to the controlling module 56.

Figure 6:
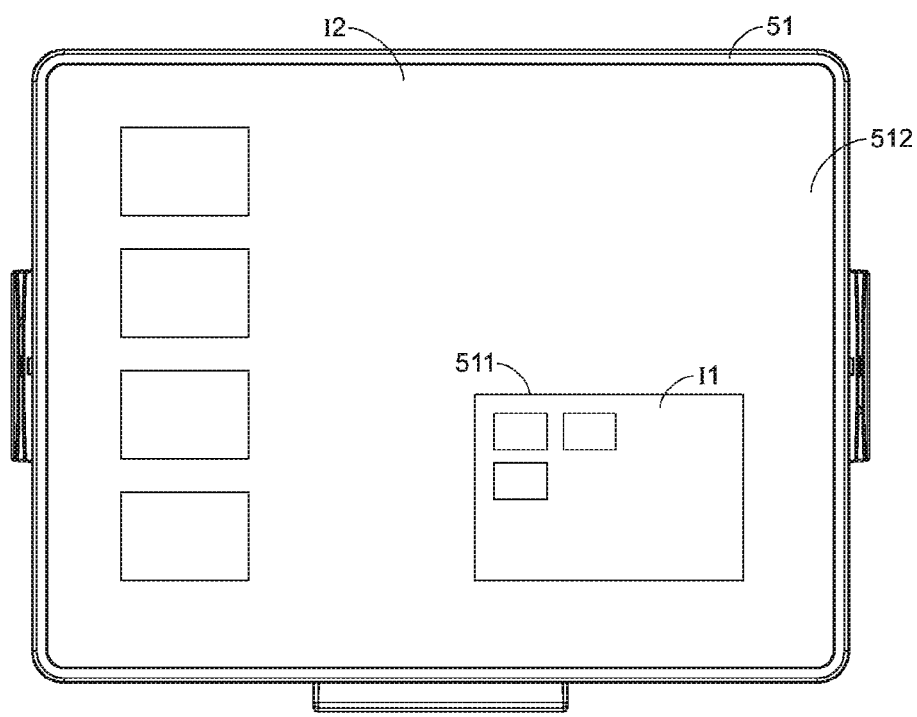
FIG. 6 schematically illustrating a first picture and a second picture simultaneously shown on the tablet computer of the dual screen POS system according to the second embodiment of the present invention.

The controlling module 56 is electrically connected with the second converter 53, the second display screen 51 and the switch element 55. The controlling module 56 has the following three functions. Firstly, the controlling module 56 can output a second picture signal S3 corresponding to a second picture I2 (see FIG. 6) to the second display screen 51. Secondly, the controlling module 56 can control the second display screen 51 to show the camera-captured picture. Thirdly, the controlling module 56 can output the first device signal S1 corresponding to the first picture I1 (see FIG. 6) to the second display screen 51. If the controlling module 56 judges that the tablet computer 50 is assembled with the POS device 40 and the camera-captured picture is shown on the second display screen 51, the camera-captured picture is replaced by the first picture I1 under control of the controlling module 56. The way of showing the extended picture is similar to the way of showing the first picture I1, and is not redundantly described herein.

As shown in FIG. 5, the controlling module 56 comprises a detecting element 561 and a controlling unit 562. The detecting element 561 is electrically connected with the second converter 53. The detecting element 561 is used for judging whether the tablet computer 50 is assembled with the POS device 40. If the detecting element 561 judges that the tablet computer 50 is assembled with the POS device 40, the detecting element 561 issues an enabling signal S5 to the controlling unit 562. The controlling unit 562 is electrically connected with the switch element 55, the second display screen 51 and the detecting element 561. The controlling unit 562 has the following three functions. Firstly, the controlling unit 562 outputs the second picture signal S3 to the second display screen 51 to control the second display screen 51 to show the second picture I2. Secondly, the controlling unit 562 outputs the camera signal S4 to the second display screen 51 in response to the camera signal S4 and the enabling signal S5. Consequently, under control of the controlling unit 562, the camera-captured picture is shown on the second display screen 51. Thirdly, after the camera-captured picture is shown on the second display screen 5, the controlling unit 562 outputs the first device signal S1 to the second display screen 51 in response to the first device signal S1. Consequently, under control of the controlling unit 562, the first picture I1 is shown on the second display screen 51.

The operations of the dual screen POS system 4 will be illustrated in more details as follows.

In case that the tablet computer 50 is not assembled with the POS device 40, the first connection part 43 and the second connection part 52 are not electrically connected with each other. That is, both of the switching element 55 and the detecting element 561 are disabled. Under this circumstance, only the second picture signal S3 is transmitted from the controlling unit 562 to the second display screen 51, and thus the second picture I2 of the tablet computer 50 is shown on the second display screen 51 in the full screen mode.

In case that the tablet computer 50 is assembled with the POS device 40 and the dual screen POS system 4 is constructed, the serialized signal S2 corresponding to the first device signal S1 is transmitted from the POS device 40 to the second converter 53 of the tablet computer 50 through the first connection part 43 and the second connection part 52. Then, the serialized signal S2 is converted into the first device signal S1 by the second converter 53 through a SERDES process. When the serialized signal S2 is received by the second converter 53, the detecting element 561 judges that the tablet computer 50 is assembled with the POS device 40. Consequently, the detecting element 561 issues the enabling signal S5 to the controlling unit 562. Meanwhile, if the camera signal S4 is transmitted to the controlling unit 562 through the switch element 55, the camera-captured picture and the second picture I2 of the tablet computer 50 are shown on the second display screen 51 in a picture-in-picture mode in response to the camera signal S4. In particular, the camera-captured picture is a sub picture included in a sub picture frame 511 of the second display screen 51 (see FIG. 6), and the second picture I2 is included in a main picture frame 512 of the second display screen 51 (see FIG. 6).

After the serialized signal S2 is converted into the first device signal S1 by the second converter 53, the second converter 53 issues the first device signal S1 to the switch element 55. Meanwhile, if the first device signal S1 is transmitted to the controlling unit 562 through the switch element 55, the camera signal S4 is no longer transmitted to the controlling unit 562. In response to the first device signal S1, the camera-captured picture in the sub picture frame 511 of the second display screen 51 is changed to the first picture I1, and the second picture I2 of the tablet computer 50 is included in the main picture frame 512 of the second display screen 51 (see FIG. 6). In other words, the first picture I1 and the second picture I2 are shown on the second display screen 51 in a picture-in-picture mode according to the operations and the settings of the controlling module 56. Consequently, the functions of the dual screen POS system 4 are more flexible and diverse.

When the tablet computer 50 is detached from the POS device 40, the detecting element 561 judges that the serialized signal S2 is no longer received by the second converter 53. Under this circumstance, the detecting element 561 judges that the tablet computer 50 is detached from the POS device 40. Consequently, the detecting element 561 issues the disabling signal S6 to the controlling unit 562. In response to the disabling signal S6, the first picture I1 and the sub picture frame 511 are no longer shown on the second display screen 51. Meanwhile, the second picture I2 is shown on the second display screen 51 in the full screen mode.

From the above descriptions, the present invention provides the dual screen POS system. The picture shown on the tablet computer of the dual screen POS system is determined according to the operating state of the tablet computer. In case that the tablet computer is assembled with the POS device, the first picture is shown on both of the second display screen of the tablet computer and the first display screen of the POS device. Alternatively, in some embodiments, the first picture is shown on the first display screen, and the extended picture is shown on the second display screen. According to the practical requirements, the first picture (or the extended picture) is shown on the second display screen in the full screen mode, or the first picture (or the extended picture) and the second picture are shown on the second display screen in a picture-in-picture mode. Consequently, the functions of the dual screen POS system are enhanced; the dual screen POS system is suitably applied to various use scenarios.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A dual screen point-of-sale system, comprising:
   a point-of-sale device comprising:
      a first display screen, displaying a first picture of the point-of-sale device in response to a first device signal, wherein the first device signal contains a first picture signal corresponding to the first picture and an extended picture signal corresponding to an extended picture;
      a first connection part, receiving the first device signal;
      a connection interface; and
      a first converter, electrically connected with the connection interface and the first connection part, wherein when the first picture signal or the extended picture signal is transferred through the connection interface to be received and converted into a serialized signal by the first converter, and the serialized signal is transmitted to the first connection part; and
   a tablet computer, detachably assembled with the point-of-sale device, comprising:
      a second display screen, displaying a second picture of the tablet computer or a picture corresponding to the first device signal;
      a second connection part wherein when the first connection part and the second connection part are in communication with each other, the serialized signal is transmitted from the point-of-sale device to the tablet computer through the first connection part and the second connection part, so that the picture corresponding to the first device signal is shown on the second display screen, wherein when the first connection part and the second connection part are not in communication with each other, the second picture is shown on the second display screen;
      a second converter, electrically connected with the second connection part, wherein when the serialized signal is received by the second converter through the first connection part and the second connection part, and the serialized signal is converted into the first picture signal or the extended picture signal by the second converter;
      a controlling unit, issuing a second picture signal corresponding to the second picture; and
      a switch element, electrically connected with the second converter, the controlling unit and the second display screen, wherein the first device signal or the second picture signal is selectively transmitted to the second display screen through the switch element, so that the picture corresponding to the first device signal or the second picture is shown on the second display screen, wherein:

when the first picture signal of the first device signal is received by the switch element and the first picture signal is transmitted to the second display screen through the switch element, the first picture is shown on the second display screen in response to the first picture signal, when the extended picture signal of the first device signal is received by the switch element and the extended picture signal is transmitted to the second display screen through the switch element, the extended picture is shown on the second display screen in response to the extended picture signal, and when the second picture signal is received by the switch element and the second picture signal is transmitted to the second display screen through the switch element, the second picture signal is shown on the second display screen in response to the second picture signal.

2. The dual screen point-of-sale system according to claim 1, wherein the first converter is a serializer.

3. The dual screen point-of-sale system according to claim 1, wherein a number of electrically-connected pins of the connection interface is larger than a number of electrically-connected pins of the first connection part.

4. The dual screen point-of-sale system according to claim 1, wherein the first picture, the second picture or the extended picture is shown on the second display screen in a full screen mode.

5. The dual screen point-of-sale system according to claim 1, wherein the second converter is a deserializer.

6. A dual screen point-of-sale system, comprising:
a point-of-sale device, comprising:
a first display screen displaying a first picture of the point-of-sale device in response to a first device signal, wherein the first device signal contains a first picture signal corresponding to the first picture and an extended picture signal corresponding to an extended picture;
a first connection part receiving the first device signal;
a connection interface; and
a first converter electrically connected with the connection interface and the first connection part, wherein when the first picture signal or the extended picture signal is transferred through the connection interface to be received and converted into a serialized signal by the first converter, the serialized signal is transmitted to the first connection part; and
a tablet computer detachably assembled with the point-of-sale device, comprising:
a second display screen displaying a second picture of the tablet computer or a picture corresponding to the first device signal;
a second connection part, wherein when the first connection part and the second connection part are in communication with each other, the serialized signal is transmitted from the point-of-sale device to the tablet computer through the first connection part and the second connection part, so that the picture corresponding to the first device signal is shown on the second display screen, wherein when the first connection part and the second connection part are not in communication with each other, the second picture is shown on the second display screen;

a second converter electrically connected with the second connection part, wherein when the serialized signal is received by the second converter through the first connection part and the second connection part, the serialized signal is converted into the first device signal by the second converter;

a camera module providing a camera signal corresponding to a camera-captured picture;

a switch element electrically connected with the second converter and the camera module, wherein the switch element receives the first device signal and the camera signal and selectively outputs the first device signal or the camera signal; and a controlling module electrically connected with the second converter, the second display screen and the switch element, wherein a second picture signal corresponding to the second picture is outputted from the controlling module to the second display screen, or the camera-captured picture is shown on the second display screen under control of the controlling module, wherein if the controlling module judges that the first connection part and the second connection are not in communication with each other, the second picture is shown on the second display screen under control of the controlling module, wherein if the controlling module judges that the first connection part and the second connection are in communication with each other, the picture corresponding to the first device signal is shown on the second display screen under control of the controlling module.

7. The dual screen point-of-sale system according to claim 6, wherein the controlling module comprises:

a detecting element electrically connected with the second converter, and judging whether the first connection part and the second connection are in communication with each other, wherein if the detecting element judges that the first connection part and the second connection are in communication with each other, the detecting element issues an enabling signal, wherein if the detecting element judges that the first connection part and the second connection are not in communication with each other, the detecting element issues a disabling signal; and a controlling unit electrically connected with the switch element, the second display screen and the detecting element, wherein the second picture signal is outputted from the controlling unit to the second display screen, or the camera-captured picture is shown on the second display screen under control of the controlling unit when the camera signal is received by the controlling unit.

8. The dual screen point-of-sale system according to claim 7, wherein if the first device signal is received by the controlling unit after the camera-captured picture is shown on the second display screen, the camera-captured picture is replaced by the picture corresponding to the first device signal.

9. The dual screen point-of-sale system according to claim 7, wherein if the detecting element judges that the first connection part and the second connection are not in communication with each other, the detecting element issues a disabling signal to the controlling unit, wherein in response to the disabling signal, the picture corresponding to the first device signal is not shown on the second display screen under control of the controlling unit.

10. The dual screen point-of-sale system according to claim 6, wherein the picture corresponding to the first device signal and the second picture are shown on the second display screen in a picture-in-picture mode, wherein the second picture is a main picture shown on the second display screen, and the picture corresponding to the first device signal is a sub picture shown on the second display screen.

11. The dual screen point-of-sale system according to claim 6, wherein the second converter is a deserializer.

12. The dual screen point-of-sale system according to claim 6, wherein the first converter is a serializer.

13. The dual screen point-of-sale system according to claim 6, wherein a number of electrically-connected pins of the connection interface is larger than a number of electrically-connected pins of the first connection part.

* * * * *